No. 613,555. Patented Nov. 1, 1898.
F. A. BOURBEAU.
STUMP PULLER.
(Application filed Jan. 14, 1898.)
(No Model.) 3 Sheets—Sheet 1.
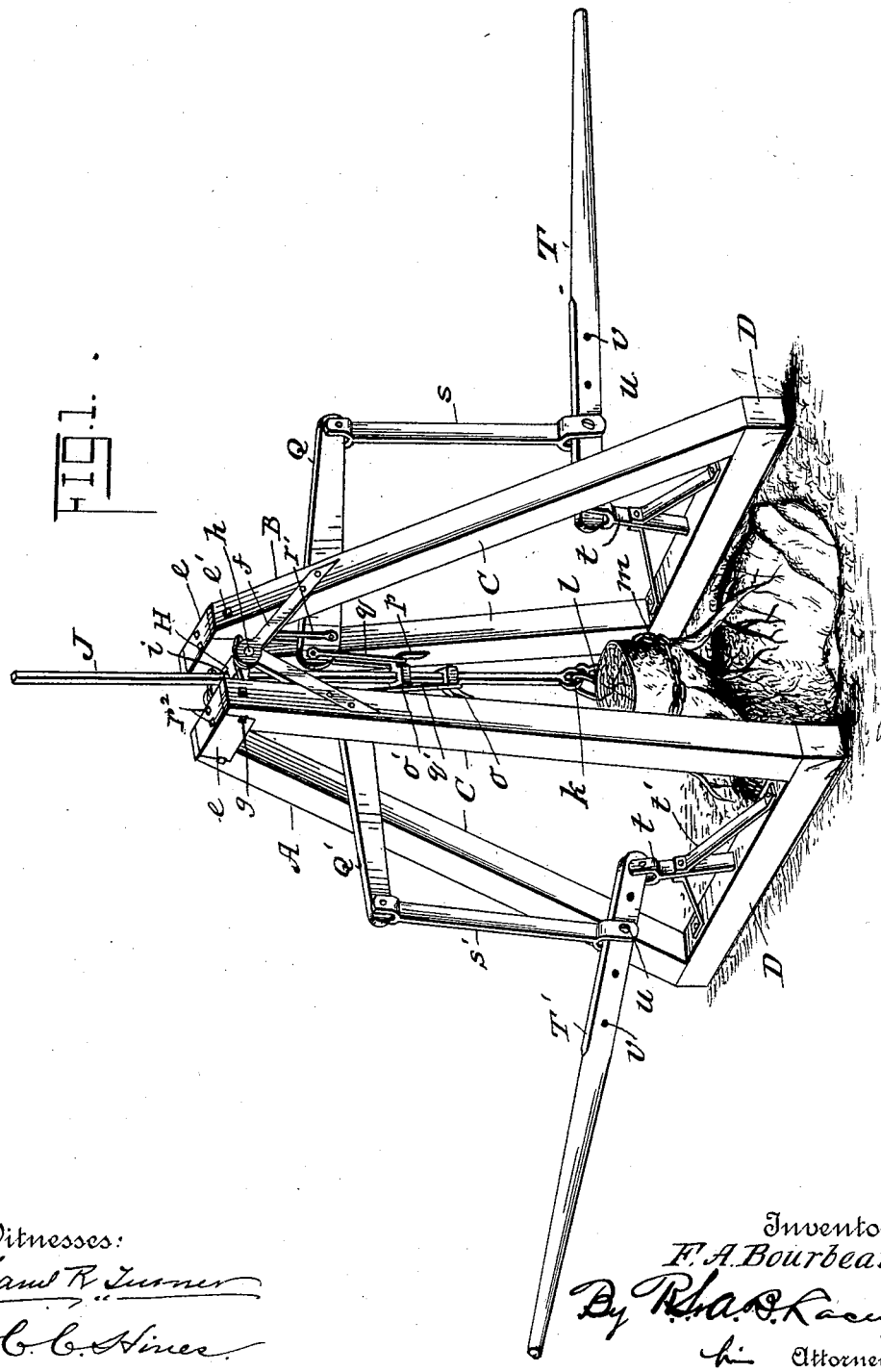
Witnesses:
Saml R. Turner
C. C. Hines
Inventor:
F. A. Bourbeau
By R. S. & A. B. Lacey
his Attorneys.

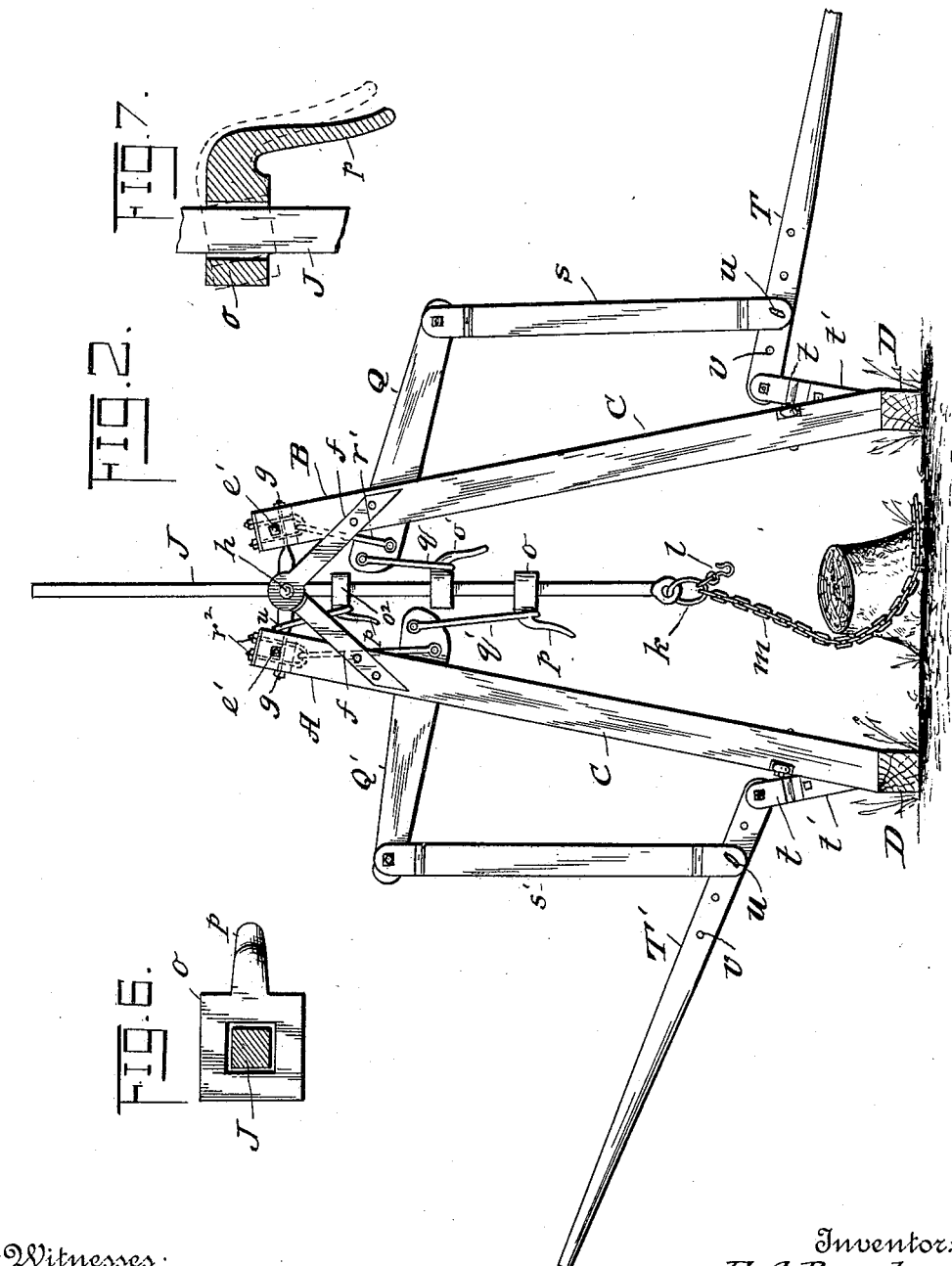

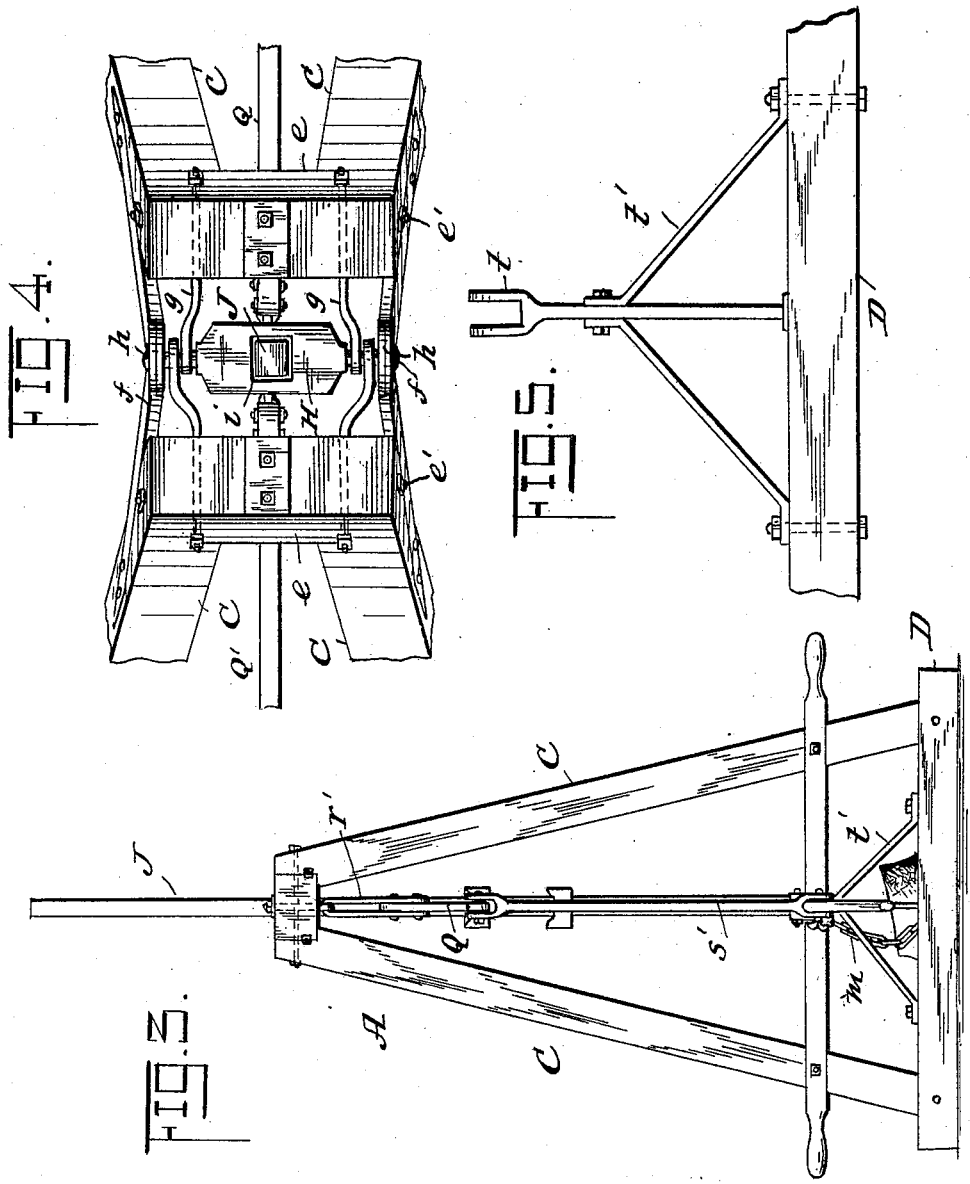

UNITED STATES PATENT OFFICE.

FREDERICK A. BOURBEAU, OF BALSAM LAKE, WISCONSIN, ASSIGNOR OF ONE-HALF TO FRED. SITTKUS, OF SAME PLACE.

STUMP-PULLER.

SPECIFICATION forming part of Letters Patent No. 613,555, dated November 1, 1898.

Application filed January 14, 1898. Serial No. 666,690. (No model.)

*To all whom it may concern:*

Be it known that I, FREDERICK A. BOURBEAU, a citizen of the United States, residing at Balsam Lake, in the county of Polk and State of Wisconsin, have invented certain new and useful Improvements in Stump-Pullers; and I do hereby declare the following to be a full, clear, and exact description of the invention, such as will enable others skilled in the art to which it appertains to make and use the same.

My invention relates to improvements in stump-pullers; and its object is to provide a simple, effective, and powerful device of this character whereby tree stumps and roots may be readily and conveniently uprooted.

With the accomplishment of this end in view the invention consists in certain novel features of construction, combination, and arrangement of parts, as will be hereinafter more fully described and claimed.

In the accompanying drawings, forming part of this specification, Figure 1 is a perspective view of a stump-puller embodying my invention; Fig. 2, a side elevational view of same; Fig. 3, an end elevational view; Fig. 4, a plan view looking down upon the head of the frame; Fig. 5, a detail view of the pivot-yoke; Fig. 6, a cross-section of the lifting-rod, and Fig. 7 a detail view of one of the clamps.

The frame of the machine comprises in its construction two approximately triangular side frames A B, each consisting of two inclined standards C, mounted at their lower ends upon sills D and connected at their upper ends by head-blocks $e$, let into the same and secured by bolts $e'$. The upper ends of said two side frames are connected by strap-hinges $f$ and eyebolts $g$, which pivot upon the end trunnions or spindles $h$ of a guide-plate H, arranged between the frames, said plate being provided with a central guide-opening $i$ for passage of a lifting rod or shaft J, which is preferably formed square or polygonal in cross-section to prevent it from rotating. This construction permits of the two side frames being folded in compact form for transportation or storage or spread apart, so as to rest upon the ground on opposite sides of stumps of different sizes. I contemplate mounting the frame on wheels or rollers, so that it may be readily and conveniently transported in operation from one tree-stump to another or to convey an uprooted stump to a place of deposit.

The lifting rod or shaft J is provided at its lower end with a ring $k$, and to this ring is connected a hook $l$ and one end of a link chain $m$, which is adapted to be passed about the stump to be uprooted and secured by engaging one of its links with said hook.

Clamps $o$ $o'$ are fitted to slide on the rod, and each clamp is provided with a curved finger or hook $p$, with which engage links $q$ $q'$, jointed to the inner ends of lifting-levers Q Q'. These levers are pivoted at their inner ends to U-shaped hanger-rods $r$ $r'$, which are connected to U-bolts $r^2$, made fast to the head-blocks $e$. The outer ends of the lifting-levers are connected through the medium of link-bars $s$ $s'$ to hand-levers T T', said hand-levers being fulcrumed at their inner ends to yoke-brackets $t$, mounted on the sills D and supported against lateral movement by braces $t'$. The lower ends of the link-bars are connected to the hand-levers by detachable pins $u$, which are adapted to engage either one of a series of holes $v$ in said levers, whereby the latter may be adjusted, as desired, to vary the leverage.

The operation is as follows: The side frames A B are rested on the ground at opposite sides of the stump, and the chain $m$ is made fast about the stump, as shown in Figs. 1 and 2. The hand-levers T T' are then alternately raised and depressed to alternately engage the clamps $o$ $o'$ with the lifting-rod J and release them therefrom, said rod being raised a short distance upon the depression of each lever. This operation is continued until the stump is entirely uprooted.

It will be understood that each time the hand-lever is elevated the inner end of the lifting-lever Q or Q', connected therewith, is lowered and the clamp suspended therefrom has horizontal position and permits the rod to slide freely through it, but that when the hand-lever is depressed and the inner end of the lifting-lever elevated the clamp assumes a slightly-inclined position and binds tightly against the rod. The rod is therefore lifted a short distance at each depression of the hand-levers. The two clamps $o\ o'$, being operated alternately, bind alternately on the rod, so that when one clamp is in action the other is out of action and permits the rod to slide through it. At each successive action, therefore, the clamp engages the rod at a point below its former point of engagement. In extracting very large or deeply-rooted stumps the hand-levers T T' may be operated simultaneously and a third clamp $o^2$, suspended by a link $u$ from one of the eyebolts $g$, provided to clamp the rod against downward movement.

The machine may be operated by two men, one working each hand-lever.

From the above description, taken in connection with the accompanying drawings, the construction and mode of operation of my improved stump-puller will be readily understood, and it will be seen that a simple, powerful, and effective apparatus is provided.

It will be understood that changes in the form, proportion, and minor details of construction may be resorted to without departing from the spirit or sacrificing any of the advantages of this invention.

Having thus fully described my invention, what I claim as new and useful, and desire to secure by Letters Patent, is—

A stump-puller comprising a frame consisting of the two sections A B each formed of two inclined standards C, the sills D connecting the lower ends of the standards, the head-blocks $e$ secured to the tops of the standards by bolts $e'$, a guide-plate H arranged between said frame-sections and formed with spindles $b$ and a rectangular guide-opening $i$, the strap-hinges $f$ and eyebolts $g$ secured to the standards and pivoting upon the spindles of the guide-plate, the U-bolts $r^2$ made fast to the head-blocks, the U-shaped hanger-rods $r\ r'$ connected to said bolts, and the yoke-brackets $t'$ mounted upon the sills, in combination with the rectangular lifting-rod J carrying the chain $m$ and extending through the opening of the guide-plate, the hand-levers T T' pivoted to the brackets $t'$, the lifting-levers Q Q' pivoted to the hangers $r\ r'$ and connected to the hand-levers by the adjustable link-bars $s\ s'$, the clamps $o\ o'$ fitted on the rod and connected to the lifting-levers by the links $q\ q'$, and the clamp $o^2$ also fitted on the rod and suspended by a link $u$ from one of the eyebolts $g$, all combined, arranged and operating, substantially as shown and described.

In testimony whereof I affix my signature in presence of two witnesses.

FREDERICK A. BOURBEAU.

Witnesses:
IRA H. PARK,
GEORGE S. WADE.